United States Patent
Peters et al.

(10) Patent No.: US 7,179,408 B2
(45) Date of Patent: Feb. 20, 2007

(54) INFINITELY VARIABLE NEEDLE ROTATION RESTRICTOR

(75) Inventors: Michael Peters, York, PA (US); Marshall Miller, Venus, PA (US); Nicole Korpanty, York, PA (US); Ed Taylor, York, PA (US)

(73) Assignee: Graham Packaging Company, L.P., York, PA (US)

( * ) Notice: Subject to any disclaimer, the term of this patent is extended or adjusted under 35 U.S.C. 154(b) by 211 days.

(21) Appl. No.: 11/011,942

(22) Filed: Dec. 15, 2004

(65) Prior Publication Data

US 2006/0130308 A1   Jun. 22, 2006

(51) Int. Cl.
*B29C 49/60*   (2006.01)

(52) U.S. Cl. .................. 264/39; 425/182; 425/536

(58) Field of Classification Search ............... 425/182, 425/536; 264/39
See application file for complete search history.

(56) References Cited

U.S. PATENT DOCUMENTS

| | | | |
|---|---|---|---|
| 3,592,886 A | 7/1971 | Havely | |
| 3,932,084 A * | 1/1976 | Reilly | 425/182 |
| 4,946,366 A | 8/1990 | Dundas et al. | |
| 6,739,858 B2 | 5/2004 | Krohn et al. | |
| 2004/0043099 A1 | 3/2004 | Krohn et al. | |

FOREIGN PATENT DOCUMENTS

JP   04358820 A  * 12/1992

* cited by examiner

*Primary Examiner*—Robert B. Davis
(74) *Attorney, Agent, or Firm*—VENABLE LLP; James R. Burdett; Keith G. Haddaway

(57) ABSTRACT

The present invention is directed to an apparatus mounted to a mold for injecting air into a mold cavity and removing exhaust from the mold cavity. The apparatus includes a needle rotation restrictor adapted to fit into a counter bore of a blow cylinder body, where the needle rotation restrictor has a hole through which a needle can pass. The blow cylinder body is mountable to the mold and has a conduit to the mold cavity and an interface for interfacing with the mold. The interface of the blow cylinder body has a counter-bore for containing the needle rotation restrictor. The apparatus further includes a needle having a cross-sectional shape adapted to restrict rotation within the hole of the needle rotation restrictor and passing through the conduit of the blow cylinder body. The needle rotation restrictor is rotatably positioned within the counter bore prior to engagement of the blow cylinder body with the mold.

21 Claims, 3 Drawing Sheets

INFINITELY VARIABLE NEEDLE ROTATION RESTRICTOR

BACKGROUND OF THE INVENTION

1. Field of the Invention

The present invention relates generally to blow molding devices and more particularly to a device for controlling rotation of a blow needle.

2. Related Art

When blow molding products, a blow cylinder body is used to position a needle to create the proper blow hole through which to blow air into the product. A clean blow hole is essential to blow an attractive, functional product. Proper positioning of the needle relative to the parison is crucial for purposes of creating a clean blow hole.

When working with a nonconcentric or nonuniform tip, such as an angled tip, positioning becomes particularly challenging. Blow needles can have angled tips where the angle can vary from about 10° to about 80°. The position of the tip, which determines the direction in which air enters the blow mold, can affect the appearance and quality of a blow molded article. Devices currently available in the art require a significant amount of guesswork when determining the ideal position for a blow needle. First, a user must make an educated guess as to where to locate the needle. Then a dowel pin is positioned, for example, at the underside of the needle piston or on the back side of the piston to prevent rotation of the piston, thus preventing rotation of the needle. If the needle is not in the optimal location, the dowel pin has to be removed, then the needle removed, repositioned, and the entire procedure started again.

This method often results in a failure to obtain the desired results, and therefore is highly inefficient. Not only is adjustment time-consuming and frustrating, but the process can require expensive reworking when an error is made.

Thus, there is a need in the art for a device that allows for easy positioning and repositioning of the blow needle during the blow molding process.

BRIEF SUMMARY OF THE INVENTION

The present invention provides a blow molding device and method that allows for the positioning and repositioning of a blow needle in order to successfully blow mold a product with efficiency and ease.

More particularly, the present invention is directed to an apparatus mounted to a mold for injecting air into a mold cavity and removing exhaust from the mold cavity. The apparatus includes a needle rotation restrictor adapted to fit into a counter bore of a blow cylinder body, where the needle rotation restrictor has a hole through which a needle can pass. The blow cylinder body is mountable to the mold and has a conduit to the mold cavity and an interface for interfacing with the mold. The interface of the blow cylinder body has a counter-bore for containing the needle rotation restrictor. The apparatus further includes a needle having a cross-sectional shape adapted to restrict rotation within the hole of the needle rotation restrictor and passing through the conduit of the blow cylinder body. The needle rotation restrictor is rotatably positioned within the counter bore prior to engagement of the blow cylinder body with the mold.

In one embodiment, the hole is non circular. The needle can have a non-uniform tip. A portion of the needle can have a non-circular cross section corresponding in shape to the hole of the needle rotation restrictor.

In a further embodiment, the hole of the needle rotation restrictor is an elongated slot with flat portions on two opposing sides. Further, the non-circular cross section of the needle has flat portions that engage the flat portions of the elongated slot to restrict rotation of the needle. The needle rotation restrictor can be adapted to be clamped between the mold and the blow cylinder body when the blow cylinder body is mounted on the mold.

In an additional embodiment, the needle rotation restrictor has a thickness greater than a depth of the counter bore. For example, the counter bore of the blow cylinder body can have a depth that is about 0.002 inches less than a thickness of the needle rotation restrictor.

The invention is also directed to an apparatus for positioning a needle passing through a blow cylinder body into a mold cavity comprising a needle rotation restrictor defining a hole through which a needle passes, where the needle rotation restrictor is mountable upon and rotatable within the blow cylinder body for positioning of the needle. In one embodiment the needle has a non-circular cross section and the shape of the hole corresponds to the non-circular cross section of the needle. The hole can be an elongated slot with flat portions on two opposing sides. In another embodiment, the non-circular cross section of the needle has flat portions that engage the flat portions of the elongated slot to restrict rotation of the needle.

The needle rotation restrictor can be adapted for mounting within a counter bore of the blow cylinder body Further, the needle rotation restrictor can have a thickness greater than a depth of the counter bore. In some embodiments, the needle rotation restrictor is generally disk shaped. The needle rotation restrictor can also have a pilot with a plurality of slots to position the blow cylinder body block in the mold.

The invention is further directed to method of positioning a blow needle on a mold by rotatably attaching a needle rotation restrictor to a blow cylinder body wherein the needle restriction rotator defines a hole through which a needle passes, mounting the blow cylinder body on a mold half such that the rotation restrictor is positioned between the mold half and the blow cylinder body, and mounting a blow needle within a conduit on the blow cylinder body such that the needle passes through the hole in the rotation restrictor and the rotation restrictor limits rotation of the needle within the blow cylinder. The method can also include blow molding a container within a mold that includes such a mold half. In a further embodiment, the method comprises loosening the blow cylinder body from the mold; rotating the needle rotation restrictor; and retightening the blow cylinder on the mold to prevent rotation of the rotation restrictor, thereby rotatably repositioning the needle.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Figure 1:
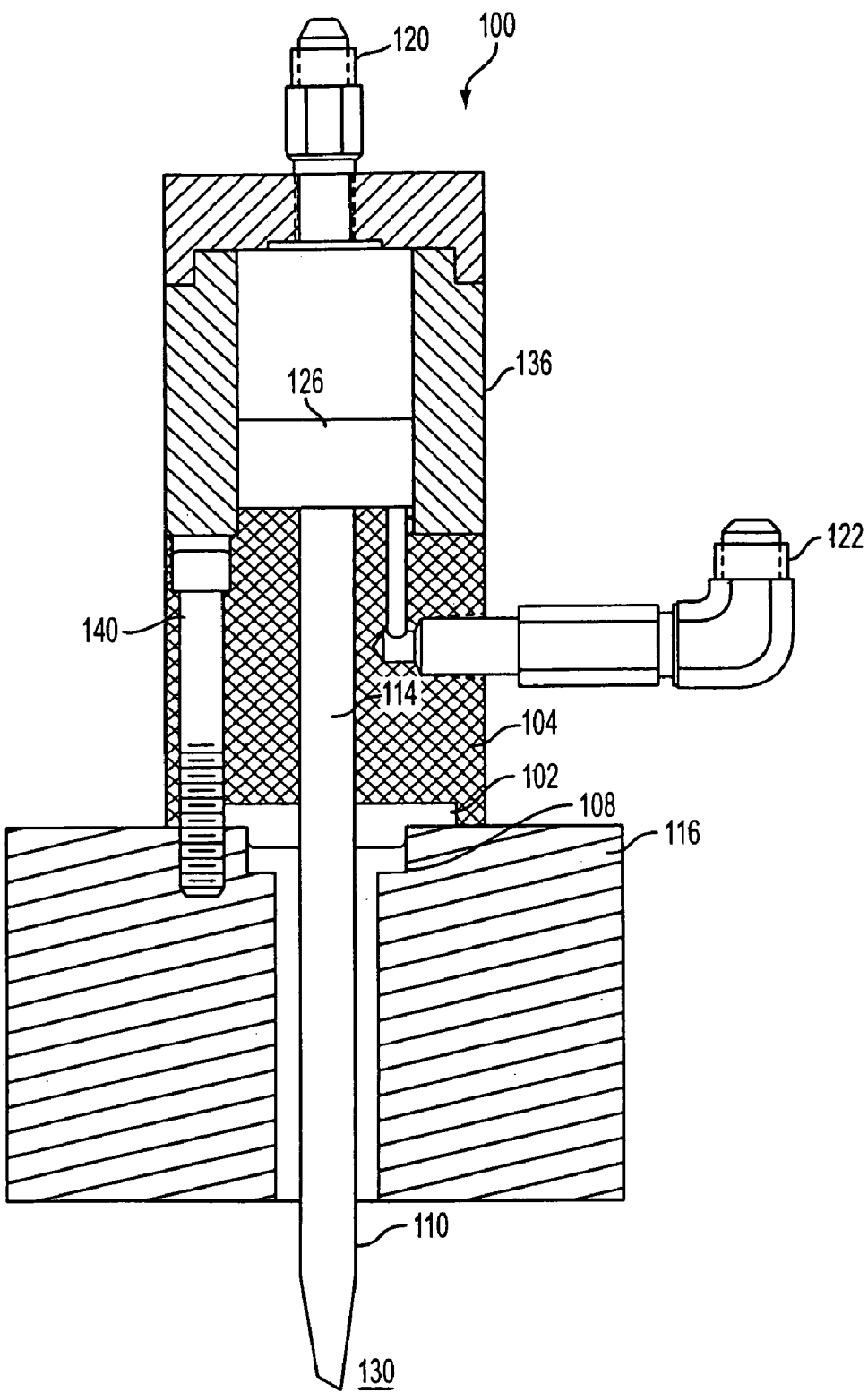
FIG. 1 depicts a blow molding device containing the apparatus of the present invention.
Figure 2:
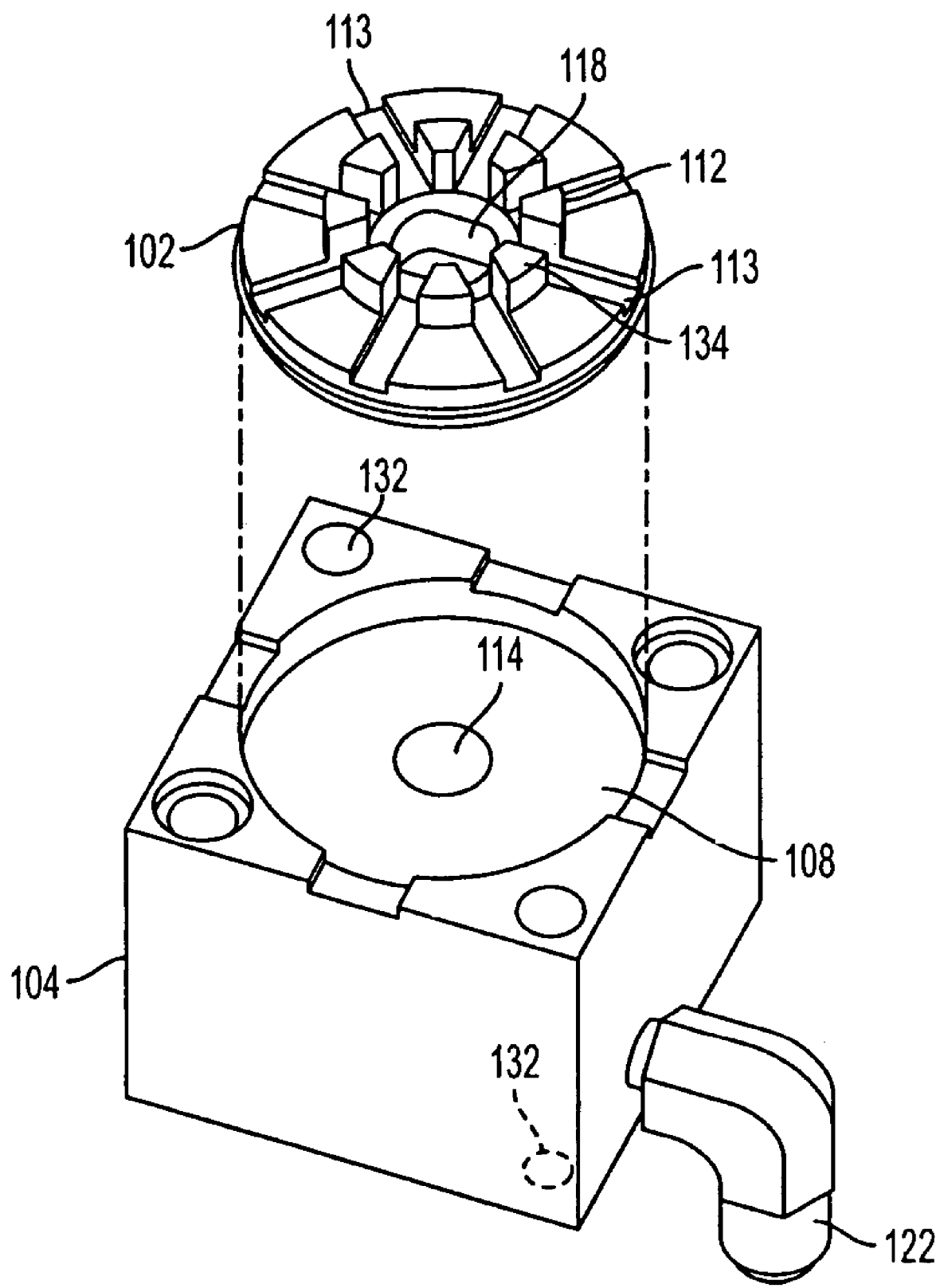
FIG. 2 depicts an exploded perspective view of the of the apparatus according to the present invention, with the needle rotation restrictor removed from the blow cylinder body.

The present invention relates to an apparatus for use in blow molding such as depicted in FIG. 1. The apparatus can be mounted to the mold at any angle. The apparatus includes a needle rotation restrictor 102 and blow cylinder body 104 (See FIG. 2). The needle rotation restrictor is adapted to fit the blow cylinder body 104 via seating in a counter bore 108 (see FIG. 2), which is a recess present on the interface end 106 of the body cylinder body 104. The interface end 106 of the blow cylinder body 104 is adjacent to the mold 116 when assembled in the blow molding device 100 (see FIG. 1).

Figure 3A:
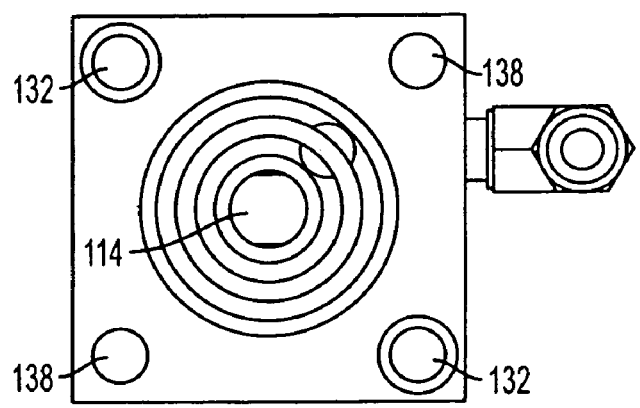
FIG. 3A depicts a top view of the apparatus according to the present invention.
Figure 3B:
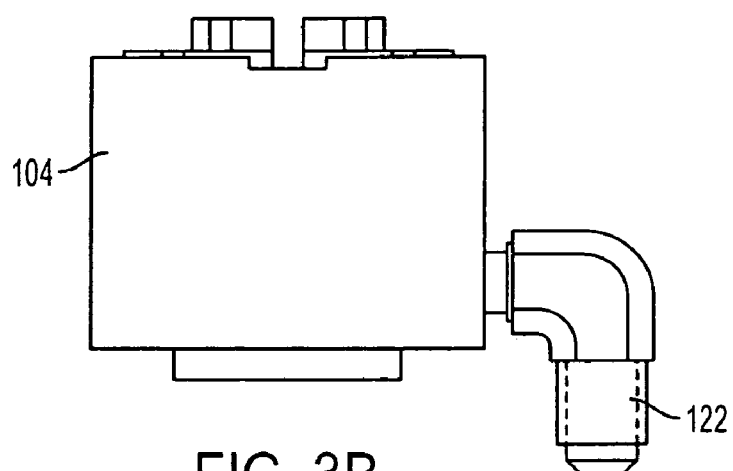
FIG. 3B depicts a side of view of the apparatus according to the present invention.
Figure 3C:
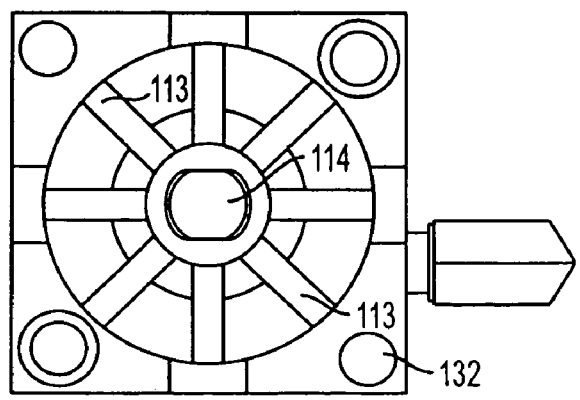
FIG. 3C depicts a bottom view of the apparatus according to the present invention.

The thickness of the needle rotation restrictor 102 can be greater than the depth of the counter bore 108; for example, the rotation restrictor can be about 0.002 inches greater than the depth of the counter bore 108. The side view of FIG. 3B shows the needle rotation restrictor 102 seated in the counterbore 108, and slightly protruding from the blow cylinder body 104. This slight protrusion allows clamping of the rotation restrictor 102 between the blow cylinder body 104 and the mold 116, when the blow cylinder body 104 is mounted on the mold 116. The needle rotation restrictor can additionally have a pilot 112 with a plurality of slots 113 to position the blow cylinder body 104 to the mold 116. Teeth 134 are also a part of the pilot 112, which extend away from the interface end 106 of the blow cylinder body 104, for positioning and interacting with the mold 116.

There is a hole 118 in the needle rotation restrictor 102 through which a needle 110 can pass. The hole 118 can be in the center of the rotation restrictor 102 and can have a shape that prevents rotation of the needle with in the hole. For example, the hole can be flat on one or more sides (see FIG. 3A), or can have other non-circular shapes. The needle 110 has a corresponding flat portion such that the needle 110 is rotationally immobilized when positioned within the rotation restrictor. In other words, the portion of the needle 110 that is engaged within the needle rotation restrictor 102 has a non-circular cross section that corresponds in shape to the hole 118 of the needle 110 in the rotation restrictor 102. The blow cylinder body has a conduit 114, substantially in alignment with the hole 118 of the needle rotation restrictor 102, through which the needle 110 also passes.

The needle rotation restrictor 102 in the illustrated embodiments is disk shaped, though other suitable shapes may be used. The blow cylinder body 104 as illustrated is square in shape, but can be any shape adapted for use in a blow molding apparatus.

The invention is also directed to a method of using the apparatus for blow molding a product. In order to position the needle 110, the blow cylinder body 104 is first loosened from the mold 116. This frees the needle rotation restrictor 102 so that the rotation restrictor can be rotated. Rotation is accomplished, for example, by inserting a tool between the blow cylinder body 104 and the mold 116. The tool takes hold of the teeth 134 (see FIG. 2) of the needle rotation restrictor 102, rotating the needle rotation restrictor 102 by rotating the teeth 134. Once the desired needle position is achieved, the blow cylinder body 104 is tightened back to the mold 116.

During a molding operation, the apparatus is activated by a supplying compressed air to the fitting 120 (see FIG. 1). Compressed air supplied through fitting 120 pushes the piston 126 into the blow cylinder body 104, which extends the needle 110 into the mold cavity 130. Compressed air is injected through port 122 to retract the needle. The present invention is not limited to this design, but can be used with other blow cylinder designs as will be evident to persons skilled in the art.

If the needle 110 needs to be adjusted, air flow through fitting 120 can be terminated, the needle 110 repositioned by loosening the blow cylinder body 104, rotating the needle rotation restrictor 102 to rotate the needle 110 to the desired position as described above, and tightening the blow cylinder body 104 by clamping the blow cylinder body 104 back to the mold 116. Compressed air can once again be supplied to fitting 120.

In the apparatus of the present invention, the blow cylinder body 104 and needle rotation restrictor 102 form a distinct piece or part, separable from the remainder of the apparatus. The blow cylinder body 106 can be connected to a blow molding apparatus by, for example, bolts 140 (pictured in FIG. 1). Bolts can be placed through the apertures 132 in the blow cylinder body 104, as illustrated in FIG. 3A. The blow cylinder body can also be connected to an upper cylinder body 136 (pictured in FIG. 1) by screws placed through apertures 138.

The apparatus described herein differs from other blow molding devices in that the blow cylinder body 104 is adjacent to the mold 116. Also, the pilot 112 and the exhaust ports 120 are incorporated as part the blow cylinder body 104, which can be easily removed and inserted from the remainder of the blow molding apparatus.

The present invention provides an improved method of blow molding products by allowing for easy respositioning of a blow needle during the blow molding process. When using a needle having a non uniform tip, such as an angled needle, determining the ideal position of the needle relative to the parison requires, almost exclusively, guesswork. In order to blow a desirable, functional product, such as a crisp and fully blow bottle, the blow hole must be a clean one. Failure to achieve the desired positioning requires removal of the entire blow molding apparatus and manual repositioning. In the prior art, such failure is fairly common, and can result in expensive reworking and frustration. The present invention, however, allows for repositioning without the problems described above. Further, once the needle has been positioned, it remains fixed.

Using the apparatus and method of the present invention, a product can be blow molded in a shorter amount of time at a reduced cost. Reworking, if any, will be far less frequent, and the frustration element nearly eliminated. Cost savings are particularly achieved by significantly reducing the time needed for positioning or repositioning of a blow needle.

Products produced using an apparatus according to the present invention include plastic bottles, containers, and any other products that can be manufactured by blow molding.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. An apparatus mounted to a mold for injecting air into a mold cavity and removing exhaust from the mold cavity, comprising:
    a needle rotation restrictor adapted to fit into a counter bore of a blow cylinder body, said needle rotation restrictor defining a hole through which a needle passes,
    said blow cylinder body mountable to the mold and having a conduit to the mold cavity and an interface for interfacing with the mold, said interface end having the counter-bore for containing said needle rotation restrictor; and
    said needle having a cross-sectional shape adapted to restrict rotation within the hole of the needle rotation restrictor and passing through the conduit of the blow cylinder body;
    wherein the needle rotation restrictor is rotatably positioned within the counter bore prior to engagement of the blow cylinder body with the mold.

2. The apparatus of claim 1, wherein the hole is non-circular.

3. The apparatus of claim 1, wherein the needle has a non-uniform tip.

4. The apparatus of claim 1, wherein at least of portion of the needle has a non-circular cross section corresponding in shape to the hole of the needle rotation restrictor.

5. The apparatus of claim 1, wherein the hole is an elongated slot with flat portions on two opposing sides.

6. The apparatus of claim 5, wherein the non-circular cross section of the needle has flat portions that engage the flat portions of the elongated slot to restrict rotation of the needle.

7. The apparatus of claim 1, wherein the needle rotation restrictor is adapted to be clamped between the mold and the blow cylinder body when the blow cylinder body is mounted on the mold.

8. The apparatus of claim 1 wherein the needle rotation restrictor has a thickness greater than a depth of the counter bore.

9. The apparatus of claim 8, wherein the counter bore of the blow cylinder body has a depth that is about 0.002 inches less than a thickness of the needle rotation restrictor.

10. The apparatus of claim 1, wherein the needle rotation restrictor has a pilot with a plurality of slots to position the blow cylinder body block in the mold.

11. An apparatus for positioning a needle passing through a blow cylinder body into a mold cavity, comprising:
    a needle rotation restrictor defining a hole through which a needle passes, said needle rotation restrictor mountable upon and rotatable within the blow cylinder body for positioning of the needle.

12. The apparatus of claim 11, wherein the needle has a non-circular cross section and the shape of the hole corresponds to the non-circular cross section of the needle.

13. The apparatus of claim 12, wherein the hole is an elongated slot with flat portions on two opposing sides.

14. The apparatus of claim 13, wherein the non-circular cross section of the needle has flat portions that engage the flat portions of the elongated slot to restrict rotation of the needle.

15. The apparatus of claim 11, wherein the needle rotation restrictor is adapted for mounting on a counter bore.

16. The apparatus of claim 11 wherein the needle rotation restrictor has a thickness greater than a depth of the counter bore.

17. The apparatus of claim 11, wherein the needle rotation restrictor is generally disk shaped.

18. The apparatus of claim 11, wherein the needle rotation restrictor has a pilot with a plurality of slots to position the blow cylinder body block in the mold.

19. A method of positioning a blow needle on a mold comprising:
    rotatably attaching a needle rotation restrictor to a blow cylinder body wherein the needle restriction rotator defines a hole through which a needle passes;
    mounting said blow cylinder body on a mold half such that the rotation restrictor is positioned between the mold half and the blow cylinder body; and
    mounting a blow needle within a conduit on the blow cylinder body such that the needle passes through the hole in the rotation restrictor and the rotation restrictor limits rotation of the needle within the blow cylinder.

20. The method of claim 19 further comprising blow molding a container within a mold that includes said hold half.

21. The method of claim 19, further comprising loosening the blow cylinder body from said mold; rotating said needle rotation restrictor; and retightening said blow cylinder on said mold to prevent rotation of said rotation restrictor, thereby rotatably repositioning said needle.

* * * * *